United States Patent [19]

Heyn et al.

[11] 4,094,519
[45] June 13, 1978

[54] SHAFT SEAL WITH HELICAL PUMPING ELEMENT

[75] Inventors: William O. Heyn; Glenn W. Peisker, both of Barrington, Ill.

[73] Assignee: Chicago Rawhide Manufacturing Company, Elgin, Ill.

[21] Appl. No.: 499,070

[22] Filed: Aug. 20, 1974

Related U.S. Application Data

[63] Continuation of Ser. No. 225,862, Feb. 14, 1972, abandoned.

[51] Int. Cl.² ............................................. B61F 15/22
[52] U.S. Cl. .................................................. 277/134
[58] Field of Search .......................................... 279/134

[56] References Cited

U.S. PATENT DOCUMENTS

| | | | |
|---|---|---|---|
| 3,534,969 | 10/1970 | Weinand | 277/134 X |
| 3,633,927 | 1/1972 | Van Deven | 277/134 |
| 3,785,660 | 1/1974 | Bush | 277/134 |
| 3,801,113 | 4/1974 | Jackson | 277/134 |

FOREIGN PATENT DOCUMENTS

| | | | |
|---|---|---|---|
| 225,796 | 3/1969 | Sweden | 277/134 |

*Primary Examiner*—Richard E. Aegerter
*Attorney, Agent, or Firm*—James T. FitzGibbon

[57] ABSTRACT

An oil or grease seal unit of the radially acting type which includes a relatively stiff mounting portion and a relatively flexible elastomeric sealing lip portion adapted to surround or be surrounded by a relatively movable machine member or element to prevent passage of fluid, such as oil or the like, axially along the shaft to the exterior of the region to be sealed. A novel form of pumping element is provided whereby a strong pumping or oil return action from the exterior of the sealed region to the interior thereof may be accomplished by the provision of generally helically disposed, rib-like pumping elements lying on one frusto-conical surface of the sealing lip. The pumping elements are disposed at an angle both to the direction of shaft rotation and to a shaft axis, and are arranged to blend into the intended area of contact between the seal lip and the shaft, that is, the static lip formed by the convergence of inner and outer frusto-conical surfaces. Pumping action remains relatively constant throughout the working life of the seal.

4 Claims, 9 Drawing Figures

U.S. Patent   June 13, 1978   Sheet 1 of 2   4,094,519
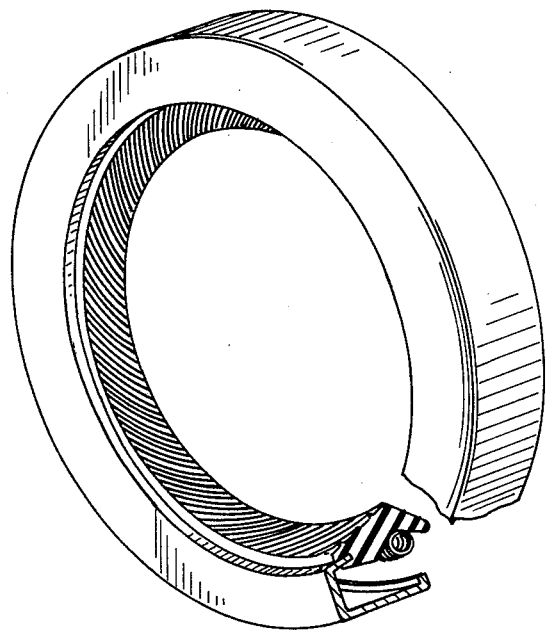
Fig_1_
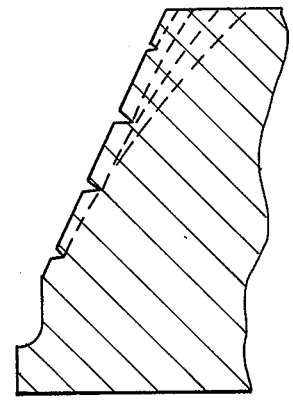
Fig_3_
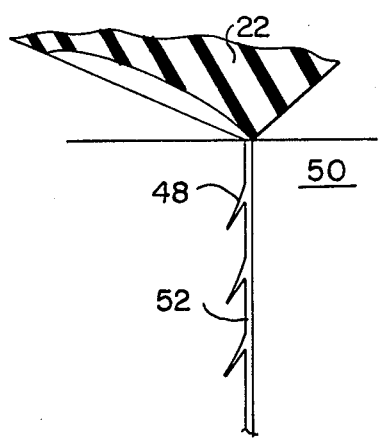
Fig_4_
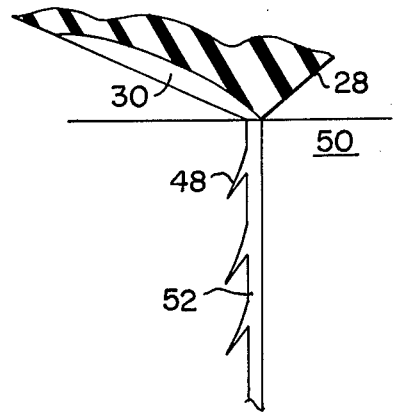
Fig_5_
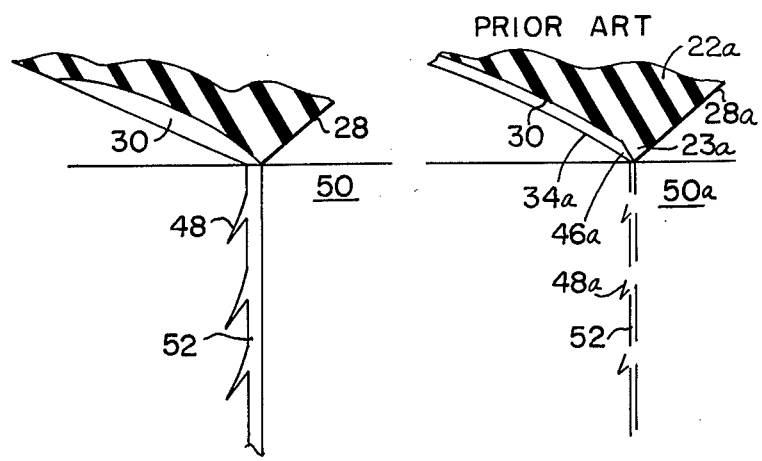
Fig_6_
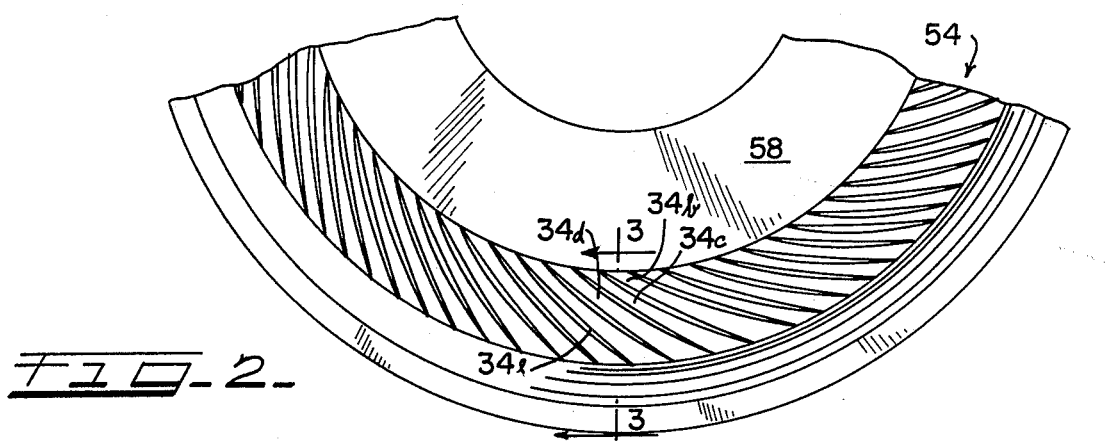
Fig_2_

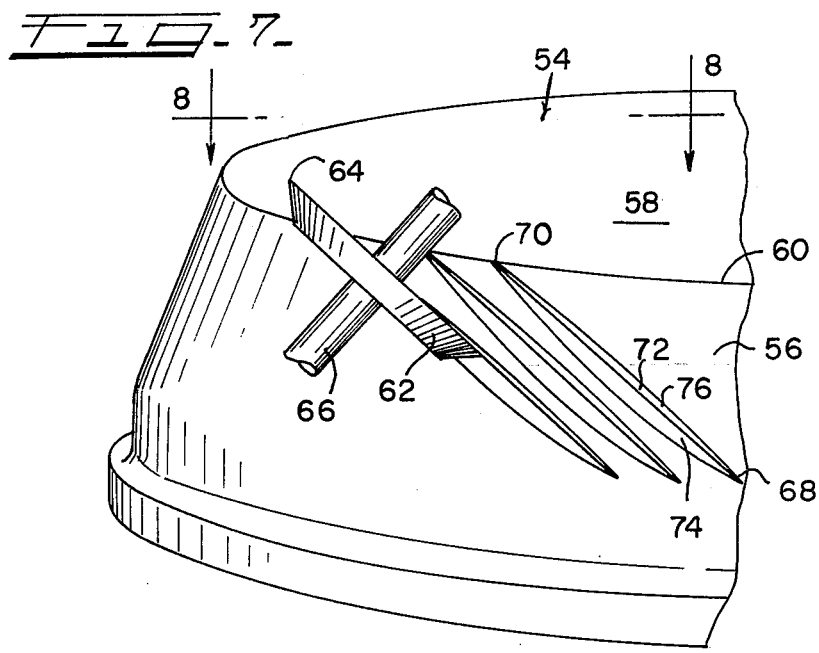
FIG-7-
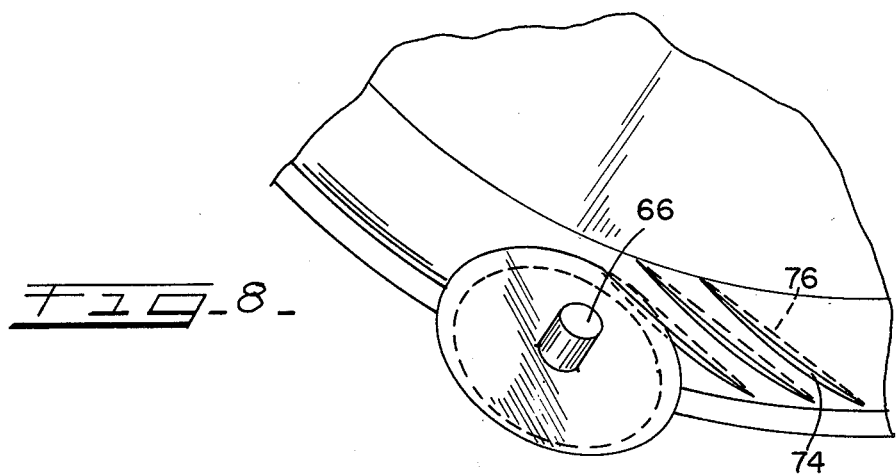
FIG-8-
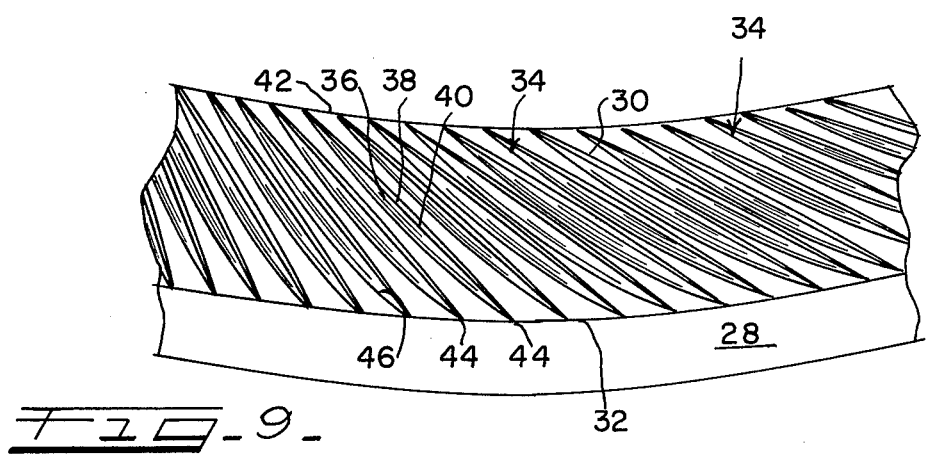
FIG-9-

SHAFT SEAL WITH HELICAL PUMPING ELEMENT

This is a continuation of application Ser. No. 225,862, filed Feb. 14, 1972, now abandoned.

BACKGROUND OF THE INVENTION

The present invention relates to oil and grease seal units and, more particularly, to radially acting seals which include a relatively stiff mounting portion and a relatively flexible elastomeric sealing lip portion which is adapted to surround or be surrounded by a relatively movable machine member or element to prevent passage of fluid, such as oil or the like, axially along the shaft to the exterior of the region to be sealed. According to the present invention, a novel form of pumping element is provided whereby a strong pumping or oil return action from the exterior of the sealed region to the interior thereof may be accomplished by the provision of generally helically disposed, rib-like pumping elements lying on one frusto-conical surface of the sealing lip. The pumping elements are disposed at an angle both to the direction of shaft rotation and to a shaft axis, and are arranged to blend into the intended area of contact between the seal lip and the shaft, that is, the static lip formed by the convergence of inner and outer frusto-conical surfaces.

In the past, use of helical pattern ribs or vanes as pumping elements has been known, and these elements are generally desirable for certain applications insofar as they provide a pumping action to return oil from the dry side of the sealing lip to the interior of the region to be sealed. In the use of typical shaft seals, the contact pattern made by the seal band on the shaft with which the seal is associated must be continuous in order to provide a proper static seal. As wear occurs, however, the configuration of the static lip contact pattern changes, and the point at which the pumping elements meet the primary seal band area is also subject to change by reason of wear, often with change in the pumping rate.

Also, in the past, the primary or static lip portion of most oil seals was formed by a raised annular rib formed by the junction of one of the frusto-conical surfaces and by a surface of increased steepness on the other frusto-conical surface. In such constructions, the pumping elements were of constant height throughout their extent and intersected the offset static lip or primary lip at a predetermined angle. This configuration of primary lip, while believed necessary for good static sealing performance, was of reduced cross section and hence subject to rapid wear. The steep angle of intersection between the pumping elements and this lip often caused a condition wherein the pumping elements caused lifting of the primary sealing lip area from the shaft or diminished the radial force of the seal band adjacent the point of intersection between the seal band and the inner ends of the pumping elements. Accordingly, prior art seals providing good pumping action were often deficient in static sealing characteristics. Furthermore, seals showing good primary seal characteristics often were subject to rapid wear and/or rapid change in pumping capacity.

Accordingly, in view of the foregoing disadvantages of certain prior art seals utilizing inclined pumping elements, an object of the present invention is to provide an improved seal with a pumping action.

Another object is to provide a seal having a primary seal bond formed merely by the junction of two frusto-conical surfaces and having a plurality of pumping elements with one radially extreme end thereof blending into this area.

Another object is to provide a seal having pumping elements or vanes of varying depth throughout their extent.

A still further object is to provide a seal which includes pumping elements having working edges which are substantially straight and which extend between circumferentially spaced apart points on one seal surface.

A further object is to provide a simplified method of making seal molding apparatus and of making seals with such apparatus.

Another object is to provide a seal wherein the pumping ribs, vanes or elements, when viewed in elevation, approach the primary lip area substantially at a tangent thereto.

A still further object is to provide a seal having improved dynamics and static seal performance in relation to generally similar but less effective prior art seals.

The above enumerated objects and others which are inherent in the invention are achieved by providing a seal having a mounting portion and a fexible sealing lip wherein the lip includes a pair of convergent frusto-conical portions meeting to define a seal band and respectively facing the interior and exterior of a region to be sealed, and having a plurality of pumping elements lying on the surface facing the exterior of the region, each of the elements having a pair of side faces meeting to define a working edge, which is substantially straight and which extends between two radially and axially offset points on the surface which points are also spaced apart from each other by an angle measured parallel to the plane of rotation of a shaft associated in use with the seal. Preferably, the working edge blends into the frusto-conical surface portion of which the edge forms a part.

The manner in which these objects and advantages are achieved in practice will become more clearly apparent when reference is made to the following detailed description of the preferred embodiments of the invention set forth by way of example and shown in the accompanying drawings, wherein like reference numerals indicate corresponding parts throughout.

BRIEF DESCRIPTION OF THE DRAWINGS

FIG. 1 is a perspective view of a seal unit according to the invention, showing the seal with portions broken away and looking from the rear or "dry" side thereof;

FIG. 2 is an axial end view of a portion of a mold core used to form the seal of the invention;

FIG. 3 is an enlarged, fragmentary sectional view of the mold core of FIG. 2, taken along lines 3—3 thereof;

FIG. 4 is an enlarged view, partly in section, and partly diagrammatic, showing a portion of the lip of a seal made according to the invention and showing the contact pattern made thereby on an associated shaft upon or shortly after installation of the seal;

FIG. 5 is a view similar to that of FIG. 4 but showing the contact pattern formed on the shaft after significant wear of the seal;

FIG. 6 is a view of a prior art seal and of the contact pattern formed thereby on an associated shaft;

FIG. 7 is a perspective view showing one step in a method of making a mold core of the invention;

FIG. 8 is a view on a slightly different perspective from that of FIG. 7, showing the manufacture of a core for making seals according to the invention; and FIG. 9 is an enlarged perspective view of a portion of the lip of a seal having pumping elements thereon.

DESCRIPTION OF THE PREFERRED EMBODIMENTS OF THE INVENTION although it will be understood that the invention might be embodied in a number of different forms, a description thereof will be made by reference to an example wherein the seal unit is a radially inwardly acting shaft seal having the pumping elements thereof lying on the frusto-conical portion of the body which is the "dry" side or the side facing outwardly of the region to be sealed.

Referring now to the drawings in greater detail, FIG. 1 shows an oil seal generally designated 10 and including an outer, relatively stiff casing portion 12 preferably made from metal and including an installation flange portion 14, an offsetting flange 16 and a sealing element mounting flange 18. The sealing lip portion 20 of the seal 10 includes a seal body 22 having a groove 24 therein for receiving an annular garter spring 26. The body 22 is also defined by an inwardly directed generally frusto-conical surface 28 and a generally oppositely disposed frusto-conical surface 30 which meet to define a seal band portion 32. Customarily, the surface 28 is more steeply inclined than the surface 30.

Referring now to FIG. 9 as well as FIG. 1, it will be noted that a plurality of pumping vanes, ribs or elements generally designated 34 are disposed about the surface 30, in parallel relation to one another, and that each element 34 is defined by a pair of oppositely directed faces 36, 38 which meet along a straight line or working edge portion 40. Accordingly, each element 34 is of varying height from the surface 30 throughout its extent, and the straight line edge 40 extends between a pair of points 42, 44 which are not only spaced apart radially and axially by reason of lying on different portions of the frusto-conical surface 30, but are also spaced apart circumferentially or are spaced apart by an angle which is measured with respect to the plane of shaft rotation.

Inasmuch as the surface 30 forms the frustum of a cone, a straight line connecting the points 42, 44 will cut across a portion of the curve, and accordingly each of the surfaces 36, 38 will be of differing height throughout its entire extent, having one edge thereof curvilinear and the outer edge straight. Moreover, with one of the points 42, lying exactly or very close to the seal band area 32 where the surfaces 28, 30 meet, the radially inner portion of the rib or pumping element 34 blends into the seal band 32 substantially at a tangent thereto.

As a consequence, in use, a substantial inner portion 46 of the edge 38 forms a pumping action contact area 48 on an associated shaft schematically shown at 50 in FIG. 3. As further shown in FIG. 3, the result is a static sealing contact area 52 on the shaft 50 which although more than a line of contact, is of narrow width as initially installed. As shown in FIG. 4, after substantial wear has taken place in the seal associated with the shaft 50, the width of the static seal band 52 extends somewhat, while the pumping action contact area 48 formed by engagement between the shaft 50 and the sealing element 34 also expands somewhat in width.

Referring again to FIGS. 3 and 4, it will be understood that these views are somewhat schematic and that they show the body 22 of the seal in a position thereof wherein it is not subjected to significant radial compressive load; however, it will be understood that in reality, the inward forces imposed by the garter spring 26 and by the sizing of the shaft 50 relative to the sealing lip 22 defect the body sufficiently to bring about the contact patterns as shown in FIGS. 3 and 4.

Referring now to FIG. 5, a form of prior art seal is shown wherein the lip portion 22a customarily included an inwardly directed static lip 23a of different geometry than that formed by the junction of the frusto-conical surfaces 28a, 30a. In the prior art, ribs 34a were intentionally manufactured so as to be of constant height throughout, except in the closest inward portions 46a thereof. As a result, it was common in the prior art for seals of this type to lack consistency in pumping action and to suffer loss of static sealing effectiveness occasioned by a lifting of the lip portion 23a off the shaft 50a where the presence of the ribs added to the stiffness of the seal body 22a.

Inasmuch as the seals 10 made according to the invention present as unusual appearance by reason of the straight edge 30a extending between the points 42, 44, an explanation of the exact configuration thereof is believed to be aided when reference is made to the method of manufacturing these seals. Accordingly, referring to FIG. 7, there is shown to be provided an unfinished seal mold core 54 having a frusto-conical surface 56 which, when placed in a mold and filled with rubber, will form the oppositely directed frusto-conical counterpart surface 30 of the seal primary lip body. the frusto-conical surface 28 in the seal body 22 is formed by another frusto-conical insert (not shown) which will be disposed in axially opposed relation to the top surface 58 of the core 54, with both surfaces meeting along the edge 60 of the core 54. However, since no cutting or other machine work is done to the opposite core, showing thereof is omitted for purposes of clarity.

In keeping with the principles of the invention, after the core 54 is fixed in a chuck or other suitable apparatus (not shown) a rotary cutting tool 62 having a sharpened edge portion 64 and mounted for rotation on a shaft 66 or the like is positioned at an angle to the axial center line of the core 54, and is moved from a position designated 68 to a position designated 70. This moves the edge 64 along a substantially perfectly straight line, and accordingly making a cut which varies in depth throughout its extent, thereby forming a straight line 72 in the surface 56 of the core 54. The surfaces 74, 76 formed in the core vary in height throughout their extent. The process of cutting the grooves is repeated once for each cut desired to be made so that any desired number of ribs, vanes or pumping elements may be formed in the finished product.

As shown in FIG. 8, which is similar to the view of FIG. 7 except that the perspective thereof is somewhat different, the cutting tool 62 may be manipulated so that the surfaces 74, 76 are of different angles with respect to a vertical cut into the core 54 which is perpendicular to the inclined surface 56 thereof. Since the illustrated form of seal is one wherein the unidirectional pumping action is provided, that is, wherein oil tends to be returned to the sealed region only upon relative shaft rotation in a given direction, it is sometimes desirable to construct each rib so that the side walls thereof are not of the same degree of inclination with respect to a line perpendicular to the surface from which they protrude. Such a case is illustrated in FIG. 8.

Referring now to FIG. 2, an end view of the core 54 is shown to be suitable for making seals of the present invention, and this view illustrates a form of seal wherein the surfaces 36, 38 of each of the elements 34 are of different angles of inclination in different areas. This is not a necessary feature of the invention, however.

FIG. 3 is taken along lines 3—3 of FIG. 2, and shows that when a single cross-sectional cut is taken through different portions of different ribs or elements 34b, 34c, 34d, and 34e, for example, the cuts designated 34b, 34c, 34d and 34e are of different depth. Thus, each cut shown in FIG. 3 shows the depth of mold core cut, and accordingly rib or pumping element height at representative positions throughout its length.

Referring now to the use of the seal, it has been found that seals made according to the invention provide an excellent pumping action and outstanding static sealing capability, with the pumping action provided being more consistent throughout the life of the seal than in prior art designs. Moreover, because of the geometric form of rib, vane or pumping element, it is of reduced cross section where it lies nearest the seal band, and therefore, a section of reduced stiffness in the element is present nearest the static lip or seal band area. The width of the pumping contact area as well as the axial extent thereof increases somewhat as wear gradually changes the seal contact pattern, and good pumping action is therefore provided throughout a considerable seal life. Moreover, since the working edge of the pumping element is of straight line form, that is, non-parallel to the frusto-conical surface of which it forms a part, it tends more closely to overly an associated round shaft, that is, its angle of incidence or departure relative to the surface of the shaft is reduced. Accordingly, a greater angle of vane or pumping element may be provided in relation to the axis of the shaft associated with the seal, and an improved pumping action results therefrom. This angle is normally less than 45°, and is preferably from about 10° to about 25°.

The exact form of seal illustrated and described in detail is characterized in that the edge portion 40 of each element 34 is substantially a straight line. However, it will be understood that it is not strictly necessary that this line be perfectly straight, and that a variation in construction might be made wherein the cut taken in the core would be somewhat arcuate rather than perfectly straight. However, according to the principles of the invention, the pumping element 34 formed by the cut is one which blends gradually into the seal band area 32 of the sealing lip body 22, and accordingly, the edge 40 should not be made parallel to the surface 30 from which the rib extends, as in prior art constructions. Naturally, the amount of variation from a straight line and the geometry of the rib 34 lying along an associated shaft 50 will also be determined in part by the angle made between the rib itself and the axial center line of the associated shaft. Nevertheless, the form illustrated has performed excellently in use and carries out the principles of the invention that the pumping elements or vanes should be of varying height throughout their extent, of reduced height adjacent the seal band, and should approach the surface of a shaft along a smooth curve.

Inasmuch as the seal of the present invention is shown to be a unidirectional seal, it is ordinarily used only with shafts having a single rotational direction, such as engine crankshafts and the like. However, the form of pumping element serving to provide the novel action might also be incorporated into a hydrodynamic seal adapted for bidirectional shaft rotation with single directional pumping, that is, a plurality of oppositely directed pairs of vanes might be provided in a single seal unit.

It will thus be seen that the present invention provides a new and improved shaft seal having a number of advantages and characteristics including those pointed out specifically herein and others which are inherent in the invention. The preferred form of seal having been shown by way of example, it is anticipated that various modifications and variations of this construction described in detail will occur to those skilled in the art and it is anticipated that these variations and changes may be made without departing from the spirit of the invention or the scope of the appended claims.

We claim:

1. An oil seal including a relatively stiff mounting portion and an elastomeric sealing lip portion, said sealing lip portion including a pair of convergent frusto-conical surface portions, one of said surface portions facing the interior or a region to be sealed and the other of said surface portions facing a region exterior thereto, said exteriorly facing surface being only a single surface with a fixed angle of inclination relative to the axis of the seal, said surface portons meeting each other to form an annular seal band of intended contact with an associated shaft and a plurality of pumping elements lying on said exteriorly facing surface, each of said elements being partially defined by a pair of side faces meeting to define a working edge portion which is straight throughout its entire extent, each of said elements being of continuously varying height throughout its entire extent and having substantially no height near said seal band, said working edge extending between two points which are radially and axially offset with respect to each other, said points being also spaced apart from each other by an angle measured paralled to the plane of said seal band, and with one of said points lying substantially on said seal band, whereby said working edge blends gradually into said frusto-conical surface portion.

2. An oil seal as defined in claim 1 wherein said pair of side faces defining each of said elements are of unequal area with respect to each other.

3. An oil seal as defined in claim 1 wherein said working edge portions form an included angle between themselves and the axis of said associated shaft of less than 45°.

4. An oil seal as defined in claim 1 wherein said working edge portions form an included angle between themselves and the axis of said associated shaft of from about 10° to about 25°.

* * * * *